United States Patent [19]

Yokoyama

[11] Patent Number: 5,313,285
[45] Date of Patent: May 17, 1994

[54] FACSIMILE APPARATUS HAVING A HELICAL SCAN VCR

[75] Inventor: Eiichi Yokoyama, Tokyo, Japan
[73] Assignee: Sony Corporation, Tokyo, Japan
[21] Appl. No.: 855,940
[22] Filed: Mar. 23, 1992

[30] Foreign Application Priority Data

Mar. 29, 1991 [JP] Japan .................................. 3-066728

[51] Int. Cl.⁵ ............................................. G09G 3/36
[52] U.S. Cl. ...................................... 358/400; 358/453
[58] Field of Search ........ 358/400, 402, 405, 452–453, 358/489; 340/731, 752, 793, 799

[56] References Cited

U.S. PATENT DOCUMENTS

| | | | |
|---|---|---|---|
| 4,885,576 | 12/1989 | Pennebaker et al. | 340/793 |
| 4,989,238 | 1/1991 | Iggulden et al. | 379/100 |
| 5,198,907 | 3/1993 | Walker et al. | 358/453 |

FOREIGN PATENT DOCUMENTS 469806 7/1991 European Pat. Off. .
3831291 3/1989 Fed. Rep. of Germany .

*Primary Examiner*—Stephen Brinich
*Attorney, Agent, or Firm*—Lewis H. Eslinger; Jay H. Maioli

[57] ABSTRACT

A facsimile apparatus includes a helical scan VTR. Binary data of a received facsimile signal is recorded on a first area of a recording medium in the VTR, and also the received facsimile signal is converted into a television signal and then recorded on a second area of the recording medium so that the recorded facsimile signal can be viewed as a video image on a screen of a TV monitor and further the recorded facsimile signal can be searched on the screen through a high-speed search.

5 Claims, 2 Drawing Sheets

| | Time Code | Reception Time | Comments |
|---|---|---|---|
| $n_1$ | 00:01:00 | 13:05:08 | Apple Inc. |
| $n_2$ | 00:05:33 | 16:00:09 | Cognex Inc. |
| $n_3$ | 00:05:45 | 20:15:05 | Camex Inc. |

FACSIMILE APPARATUS HAVING A HELICAL SCAN VCR

BACKGROUND OF THE INVENTION

1. Field of the Invention

The present invention generally relates to facsimile apparatus and, more particularly, is directed to a facsimile apparatus having a helical scan video tape recorder (VTR).

2. Description of the Related Art

In general, the facsimile communication utilizing a telephone line network is very convenient since it can transmit information such as characters and figures or the like and also communicate with a facsimile apparatus of another party even if a person on the other party side is absent. A conventional facsimile receiver for the facsimile communication utilizing a telephone line network prints on paper all information such as characters and figures transmitted through the network.

However, thermal paper used in a facsimile receiver for home use etc. is expensive and difficult to maintain the print quality thereof since it is likely fade.

Further, recently, various information such as economical and immovable information, sales using catalogs and telephone shopping or the like have been provided through facsimile communication. When all of this information is printed on the paper by the facsimile receiver for home use, many sheets of thermal paper are required disadvantage.

Thus, in view of the propagation of the facsimile receiver for home use, it is convenient to modify the facsimile receiver so as to be able to record or print only required information on paper.

OBJECTS AND SUMMARY OF THE INVENTION

Therefore, it is an object of the present invention to provide an improved facsimile apparatus having a helical scan VTR in which the aforementioned shortcomings and disadvantages encountered with the prior art can be eliminated.

More specifically, it is an object of the present invention to provide a facsimile apparatus having a helical scan VTR which can show information received through the facsimile communication as a good video image, and also can retrieve the received information on a video screen to thereby print only the required information on paper, thereby decreasing the amount of paper to be used.

As an aspect of the present invention, a facsimile apparatus having a helical scan VTR includes a unit for recording binary data of a received facsimile signal on a first area of a recording medium, and a unit for converting the received facsimile signal into a television signal and for recording the converted television signal on a second area of the recording medium.

According to the thus constituted facsimile apparatus of the present invention, since the received facsimile signal is converted into the television signal and then recorded on the second area of the recording medium, the recorded facsimile signal can be viewed as a video image on a screen by supplying the recorded facsimile signal to a TV monitor. Further, the recorded facsimile signal can be searched on the screen by searching the television signal recorded on the second area through a high-speed search. Furthermore, the binary data of the facsimile signal recorded on the first area of the recording medium corresponding to the required information of the recorded television signal which is selected through the high-speed search operation can be printed on paper, whereby only the required information can be printed on paper with good printing quality to thereby decrease the amount of papers to be used.

The preceding and other objects, features, and advantages of the present invention will become apparent from the following detailed description of an illustrative embodiment thereof when read in conjunction with the accompanying drawings.

DESCRIPTION OF THE PREFERRED EMBODIMENT

A facsimile apparatus having a helical scan VTR according to an embodiment of the present invention will now be described with reference to FIGS. 1 to 4.

Figure 1:
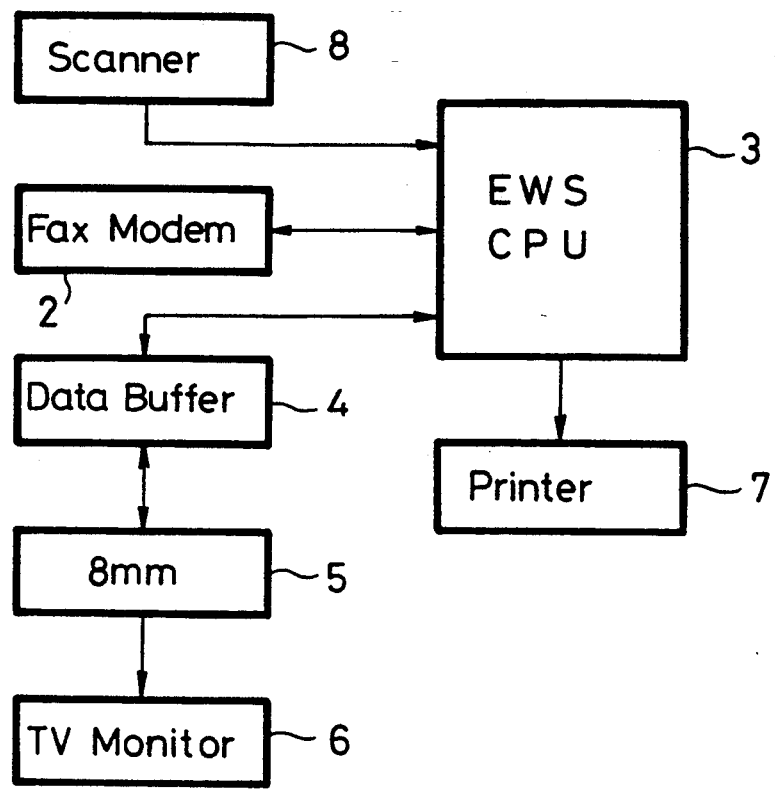
FIG. 1 shows in block form an arrangement of a facsimile apparatus having a helical scan VTR according to an embodiment of the present invention.
Figure 2:
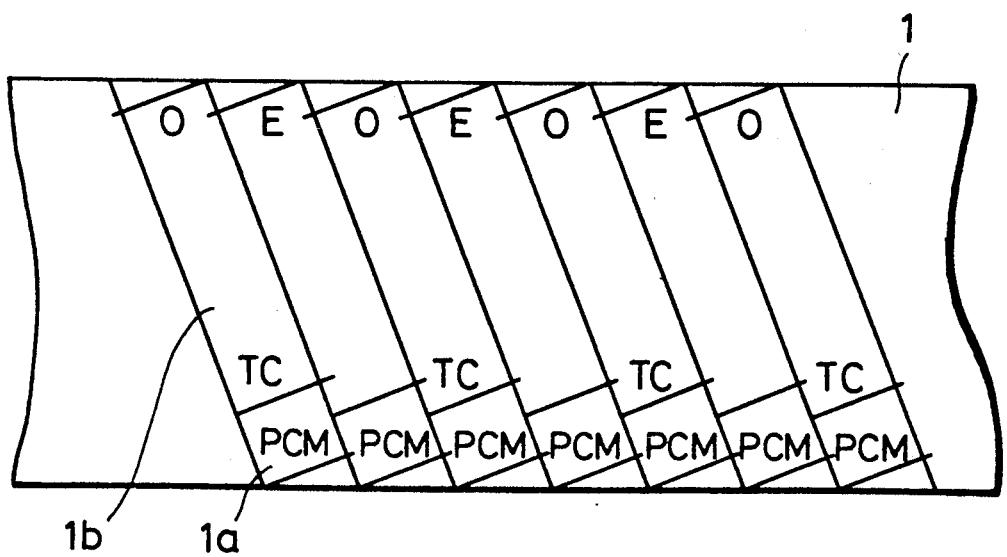
FIG. 2 is a schematic diagram of a track pattern formed on a magnetic tape by an 8-mm VTR.

FIG. 1 shows in block form an arrangement of a facsimile apparatus having a helical scan VTR according to an embodiment of the present invention. Referring to FIG. 1, a modem 2 receives a facsimile signal transmitted over a telephone line network and also transmits a facsimile signal to the telephone line network. The modem 2 supplies the received facsimile signal to an engineer workstation (EWS) 3 having a central processing unit (CPU) for performing various signal processing and organizing. When the facsimile signal received by the modem 2 is supplied to the workstation 3, the workstation 3 processes the received facsimile signal and supplies the processed signal to an 8-mm VTR 5 or VCR (video cassette recorder) through a data buffer circuit 4. Then, the 8-mm VTR 5 records the processed signal on a recording medium, e.g., magnetic tape 1 (see FIG. 2). The magnetic tape 1 used in the 8-mm VTR 5 has a first area, that is, a pulse code modulation (PCM) area 1a and a second area, that is, a video track area 1b as shown in FIG. 2. In this embodiment, binary data of the facsimile signal is recorded on the PCM area 1a in a form accordance with a PCM audio format of the 8-mm VTR, while the facsimile signal is converted into an NTSC television signal and then recorded on the video track area 1b.

Figures 3, 4:
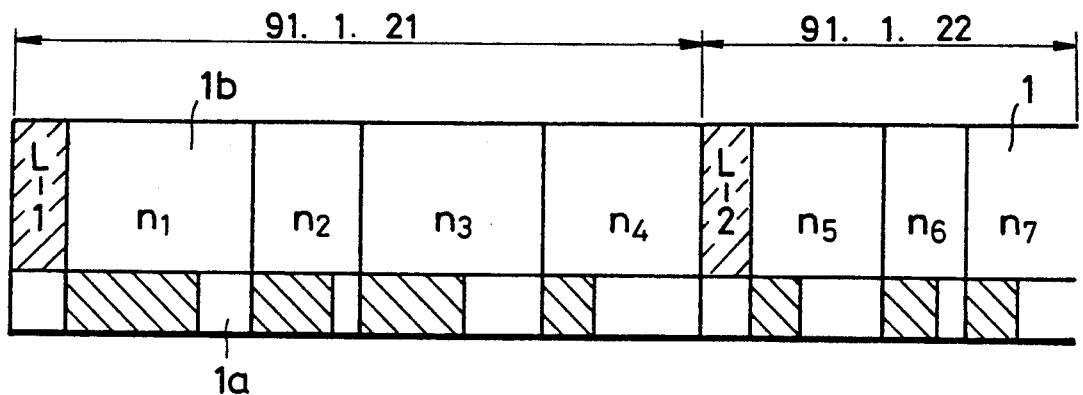
FIG. 3 is a schematic diagram of a recording format of the facsimile signal on the magnetic tape according to the embodiment.
FIG. 4 is a schematic diagram illustrating an example of a list to be recorded on the magnetic tape.

The binary data of the facsimile signal is recorded under the control of the workstation 3 on the PCM area 1a of the magnetic tape 1 on which a time code is recorded in advance. In this case, the binary data of the facsimile signal to be recorded may be a G3 or G4 facsimile signal of a band compressed MH (modified Huffman), MR (modified READ) or MMR (modified modified READ). In the case of recording the facsimile signal of plural pages n1, n2, ... on the magnetic tape 1, the facsimile signal is arranged per one day, for example, as shown in FIG. 3, and then an index signal, that is, a list L-1, L-2, ... is provided at a header portion of each facsimile signal of one day. Each of the lists L-1, L-2, . . . includes data such as a time code, a received time and a comment, for example, as shown in FIG. 4. In reproducing, a required facsimile signal is retrieved by retrieving the time codes referring to the lists L-1, L-2, . . . .

In this embodiment, when the facsimile signal includes characters and figures or the like of one page n1, n2, . . . , in a mixed state, the content of one page is divided into plural sections, for example, five sections and then each section is converted into a television signal to thereby be recorded on the tape so that a viewer can easily view the facsimile signal on a television receiver for home use. In this case, the received facsimile signal is divided into windows in accordance with the content of one page, and a divided image of frame unit, in which each of the divided images which is multiplied by a magnification of m pixel (lateral)×n pixel (vertical) in accordance with each window, is recorded on the tape. Each of the divided images per one frame is constituted by at least 8 frames and then recorded on the video track 1b after being multiplied by an integer In reproducing, the thus recorded facsimile signal can be recognized easily on an NTSC television (TV) monitor 6 by searching the reproduced image on the screen through a high-speed search operation, that is, cue or review operation.

The reproduced output signal from the 8-mm VTR 5 is supplied to the TV monitor 6 and then the television signal recorded on the video track area 1b of the magnetic tape 1 is reproduced thereon in accordance with an instruction from the workstation 3. Referring to FIG. 1, a printer 7 prints, in accordance with an instruction from the workstation 3, the binary data of the facsimile signal which is recorded on the PCM area 1a and reproduced by the 8-mm VTR 5.

A scanner 8 reads characters and figures or the like and supplies the read data signal to the workstation 3 which in turn delivers the data representing the characters and figures etc. to the telephone line network through the modem 2 as a facsimile signal.

In the thus constituted facsimile apparatus, when the facsimile signal is supplied to the workstation 3 through the modem 2, the facsimile signal is converted into the binary data in accordance with the audio PCM signal and then supplied to the 8-mm VTR 5 through the buffer circuit 4 to thereby be recorded on the PCM area 1a of the magnetic tape 1. Further, the received facsimile signal is converted into the NTSC television signal by the workstation 3 and supplied to the 8-mm VTR 5 through the buffer circuit 4 to thereby be recorded on the video track area 1b of the magnetic tape 1. In this case, the data representing the time code and the received time or the like which is controlled by the workstation 3 is recorded on the video track 1b as well as the facsimile signal.

According to the thus constituted facsimile apparatus of this embodiment, since the received facsimile signal is converted into the NTSC television signal and then recorded on the video track area 1b of the magnetic tape 1, the facsimile signal recorded on the magnetic tape 1 can be viewed as a video image on the screen by supplying the recorded facsimile signal to the TV monitor 6. Further, the recorded facsimile signal can be searched at high speed on the screen by using the television signal recorded on the video track area 1b, that is, cue or review operation as ordinary VTRs. Furthermore, the binary data of the facsimile signal recorded on the PCM area 1a corresponding to the required information of the recorded television signal which is selected through the high-speed search operation can be printed on paper by utilizing the data of the time codes and the received time, whereby only the required information can be printed on paper with good printing quality to thereby decrease the amount of paper to be used.

While, in the above-described embodiment, the magnetic tape 1 is utilized as a recording medium, other types of recording medium may be used in place thereof.

As set out above, according to the present invention, since the received facsimile signal is converted into the television signal and then recorded on the second area of the recording medium, the recorded facsimile signal can be viewed as a video image on the screen by supplying the recorded facsimile signal to the TV monitor. Further, the recorded facsimile signal can be searched on the screen by using the television signal recorded on the second area through the high-speed search. Furthermore, the binary data of the facsimile signal recorded on the first area corresponding to the required information of the recorded television signal which is selected through the high-speed search operation can be printed on paper, whereby only the required information can be printed on paper with good printing quality to thereby decrease the amount of paper to be used.

Having described the preferred embodiment of the invention with reference to the accompanying drawings, it is to be understood that the invention is not limited to that precise embodiment and that various changes and modifications thereof can be effected by one skilled in the art without departing from the spirit or scope of the invention as defined in the appended claims.

What is claimed is:

1. A facsimile apparatus comprising:
   a helical scan VTR;
   means for recording binary data of a received facsimile signal on a first area of a recording medium in the VTR;
   means for converting the received facsimile signal into a television signal and for recording the converted television signal on a second area of the same recording medium;
   a printer connected to said recording and converting means; and
   a TV monitor connected to said recording and converting means;
   whereby said received facsimile signal can be optionally viewed on said TV monitor or printed out by said printer.

2. A facsimile apparatus according to claim 1 further comprising means for recording an index signal on the recording medium in addition to the received facsimile signal to facilitate a search of said recording medium.

3. A facsimile apparatus according to claim 1 further comprising means for recording on the recording medium the time at which the facsimile signal is received.

4. A facsimile apparatus according to claim 1 wherein said TV monitor displays a video image derived from said converted television signal as recorded on said second area of said recording medium.

5. A facsimile apparatus comprising:
   a modem for receiving a facsimile signal transmitted over a telephone line network and transmitting a facsimile signal to the telephone line network;

a work station connected to the modem and having a control processing unit for performing signal processing and organizing;

a helical scan VTR connected to the work station for recording binary data of the facsimile signal on a first area of a recording medium in the VTR and for recording a television signal derived from the facsimile signal on a second area of the same recording medium;

a TV monitor connected to the VTR and controlled by the control processing unit for displaying a video image derived from the television signal; and a printer controlled by the control processing unit;

whereby said received facsimile signal can be optionally viewed on said TV monitor or printed out by said printer.

* * * * *